(No Model.)
R. A. CHESEBROUGH.
Process of Obtaining Perfume of Natural Flowers and Apparatus Therefor.
No. 243,510. Patented June 28, 1881.
2 Sheets—Sheet 1.
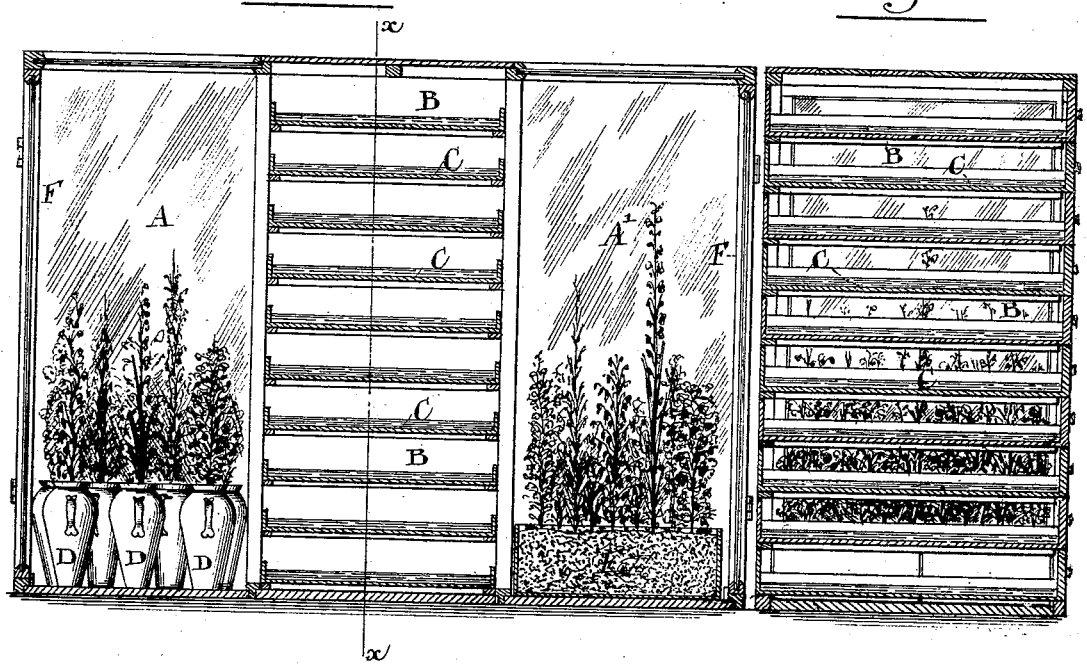
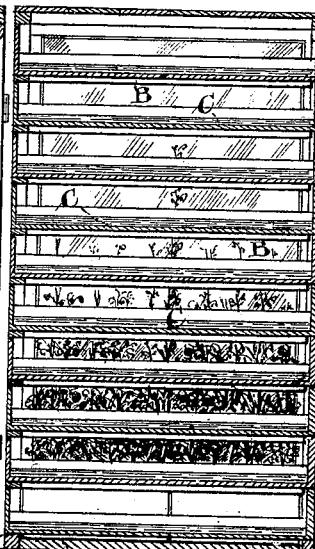
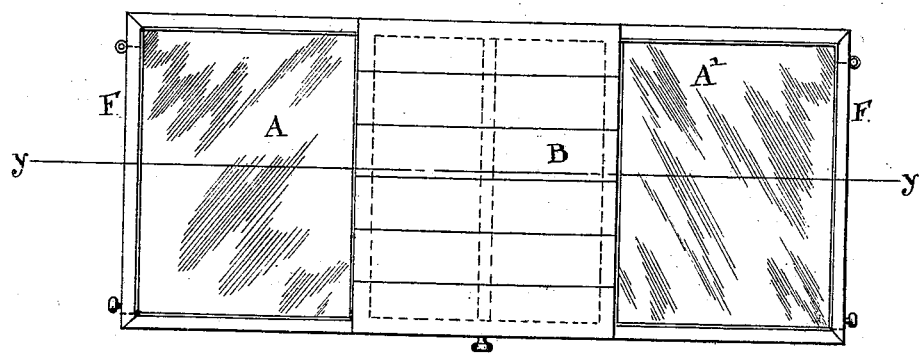
Witnesses:—
Inventor:—

(No Model.) 2 Sheets—Sheet 2.

R. A. CHESEBROUGH.

Process of Obtaining Perfume of Natural Flowers and Apparatus Therefor.

No. 243,510. Patented June 28, 1881.

Witnesses:-

Inventor:

UNITED STATES PATENT OFFICE.

ROBERT A. CHESEBROUGH, OF NEW YORK, N. Y.

PROCESS OF OBTAINING PERFUME OF NATURAL FLOWERS, AND APPARATUS THEREFOR.

SPECIFICATION forming part of Letters Patent No. 243,510, dated June 28, 1881.

Application filed April 26, 1881. (No model.)

*To all whom it may concern:*

Be it known that I, ROBERT AUGUSTUS CHESEBROUGH, of the city, county, and State of New York, have invented new and useful Improvements in the Process of Obtaining Perfumes of Natural Flowers, known as "Enfleurage," and in Apparatus for the Same, of which the following is a specification, reference being had to the accompanying drawings.

In the process of obtaining perfumes from natural flowers, known as "enfleurage," as heretofore practiced, the grease by which the perfume is to be absorbed is either spread on plates or trays or on cloth-covered frames, or is applied to loose cotton laid in trays, and the flowers, taken from or divested of their stems and leaves, are spread upon the said trays, plates, or frames in direct contact with the grease. The flowers in this condition soon die or commence to decay and cease to give out perfume. In practice they become worthless in about twenty-four hours, and then have to be removed and replaced by fresh ones.

The object of my invention is to obtain from the flowers a greater quantity of perfume than is possible or practicable when the flowers are plucked from their stems and placed in direct contact with the grease or absorbing agent; and to this end my improved process consists in so placing flower-stems with the flowers upon them in water or moist earth, or any moist material, in the same chamber with the absorbing agent, or in a separate chamber communicating with a chamber containing the said agent, that the perfume of the flowers may circulate over or in contact with the said agent without the flowers themselves being in contact therewith. The flowers may thus be kept alive for several days, during the whole of which time they may continue to give off perfume, which will be taken up by the absorbing agent.

My invention consists, further, in the apparatus hereinafter described for use in this process.

Figure 4:
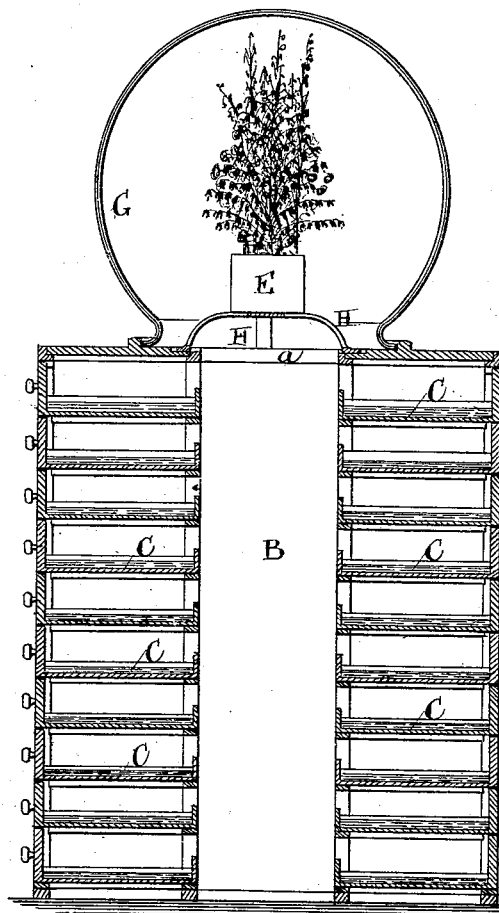
Figure 5:
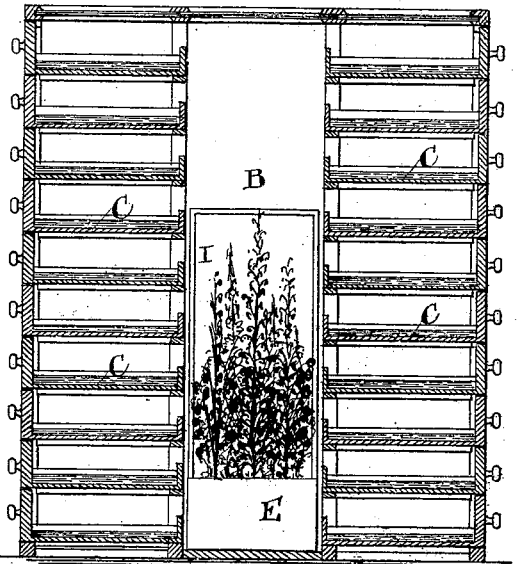

Figure 1 in the drawings is a vertical section of one form of my apparatus in the line *y y* shown in Fig. 2, which is a plan of the same. Fig. 3 is a vertical section at right angles to Fig. 1 in the line *x x*. Figs. 4 and 5 are vertical sections of modifications of my apparatus.

The apparatus shown in Figs. 1, 2, and 3 consists of three chambers, A A' B, of which the outer ones, A A', contain the flowers, and the central one, B, contains the absorbing agent.

The central chamber, B, is composed of a frame so filled with a series of trays or drawers, C C, that when the said trays or drawers are in place their backs and fronts form a closed back and front to the said chamber, as shown in Fig. 3. The said trays or drawers have their sides shallower than the back and front, as shown in Fig. 2, so that spaces are left between the said trays or drawers, communicating freely with the chambers A A'. The trays or drawers have their bottoms, which may be of glass, covered with a thin layer of the absorbing agent. The absorbing agent which I propose to use is what is known as "vaseline," or the inodorous oil obtained from petroleum by refining with bone-black.

The chambers A A' have their outer sides, their backs and fronts, and their tops made almost wholly of glass, to admit light freely to the flowers therein. In the chamber A flower-stems with the flowers upon them are represented as placed in water in vases D D. In the chamber A' similar flower-stems are represented as set in a box, E, containing moist earth or sand, or other moist material. Doors F F' are provided in both chambers, to permit the insertion and removal of the flowers. The flowers remaining on their stems while the latter are in water or moist material will be kept alive for a very much longer time than if plucked from the stems and placed directly in contact with the absorbing agent, and so long as they are kept alive they give off perfume, which is absorbed by the vaseline or oil in the trays or drawers B. The flower-stems and flowers may be removed as soon as they begin to decay and be replaced by fresh ones, and this removal and renewal may be repeated until the vaseline or oil is perfumed to the desired strength, when the trays or drawers C C may be removed and the vaseline or oil taken out from them and fresh vaseline or oil be placed in them.

In the modifications of my apparatus shown in Fig. 5 the chamber B, in which the absorbing agent is contained, is fitted on opposite sides with trays or drawers C, which extend less than half-way across, leaving a central space, at the top of which is an opening, *a*, above which is placed a glass dome, G, forming an upward extension of the chamber B, for the reception of the flower-stems, which are set in a box, E, containing moist earth, supported on a skeleton-frame, H, over the opening *a*, in such manner that the perfume from the flowers may circulate freely through the said opening *a* into the chamber B and over the trays or drawers. The dome G is removable, to permit the removal and renewal of the flower-stems.

In the modification of my invention shown in Fig. 5 the chamber B has the trays or drawers C C arranged as shown in Fig. 4, and the flower-box E is placed in the central space of the chamber, between the drawers or trays. In this case the chamber B has a door, I, in one side for the insertion and removal of the flower-stems.

What I have termed the "chambers" A A′ B in describing Figs. 1, 2, and 3 may, in one sense, be considered as merely parts of a single chamber, containing both the flowers and the absorbing agent, and in the same sense it may be said that the chamber B and dome G are parts of one chamber.

What I claim as my invention, and desire to secure by Letters Patent, is—

1. The improved process of enfleurage, consisting in placing flower-stems with the flowers upon them in water or moist earth or material in the same chamber with the absorbing agent, or in a chamber communicating with the chamber containing said agent, but with the flowers out of contact with said agent, substantially as herein described.

2. An apparatus for enfleurage, consisting of a chamber or communicating chambers containing trays or drawers for the absorbing agent and receptacles in which flower-stems may be placed with their flowers out of contact with said agent, substantially as herein described.

ROBT. A. CHESEBROUGH.

Witnesses:
FREDK. HAYNES,
A. C. WEBB.